(12) United States Patent
Duke

(10) Patent No.: US 6,769,753 B2
(45) Date of Patent: Aug. 3, 2004

(54) MINIMUM PERIOD CIRCUIT

(75) Inventor: Ronald J Duke, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 130 days.

(21) Appl. No.: 10/186,090

(22) Filed: Jun. 28, 2002

(65) Prior Publication Data

US 2004/0001115 A1 Jan. 1, 2004

(51) Int. Cl.[7] .............................................. B41J 29/38

(52) U.S. Cl. ......................................................... 347/5

(58) Field of Search ........................... 347/5, 9, 10, 14, 347/11, 141, 142, 143, 144, 7; 377/94, 111, 118

(56) References Cited

U.S. PATENT DOCUMENTS 3,908,181 A * 9/1975 Shigaki et al. .............. 341/143

* cited by examiner

*Primary Examiner*—Raquel Yvette Gordon
(74) *Attorney, Agent, or Firm*—Barbara Joan Haushalter

(57) ABSTRACT

A minimum period circuit is used to process incoming encoder pulses for an imaging system that prints on a recording media in response to pulses from an encoder. The system using the minimum period circuit receives pulses from an encoder and generates output pulses that can by employed by the imaging system to define pixel locations. A difference between the number of pulses received from the encoder and the number of output pulses is determined, and it is further determined if this difference is positive. A minimum period is defined between output pulses. Finally, the output pulse generation is prompted to produce a pulse when the difference is positive and the time since the last output pulse exceeds the minimum period.

14 Claims, 4 Drawing Sheets

MINIMUM PERIOD CIRCUIT

TECHNICAL FIELD

The present invention relates to a circuit for controlling the signals used to drive a print engine of a continuous ink jet printer and, more particularly to a circuit designed to allow for all impulses sent from the printer controller to reach the print engine, especially when the controller is requesting a print speed in excess of the printer capability.

BACKGROUND ART

In many common digital printing techniques, there are maximum print speeds associated with the print engine or printhead. For a continuous ink jet printer for example the maximum print speed is limited by the drop production rate. In laser printers, the maximum speed may be limited by the laser scanning speed. Even the clock rate for data transfer in the control electronics can define the maximum print speed. The print engine defined maximum speed limit will be denoted as the red line limit. To obtain maximum efficiency out of these print engines it is often desirable to operating the printers as close to the red line limit as possible. Attempting to operate the printer faster than the red line limit will lead to a printer failure. The printer failure may involve missing print, scrambled print, or even a lock up of the printer electronics.

Digital printers also often employ an encoder or tachometer to monitor the motion of the print medium relative to the printhead. The print data is transferred to the print engine in response to appropriate tachometer pulses. The existence of a maximum speed limit for the printer corresponds to there being a Printer Limited Minimum (PLM) Period between tachometer pulses below which printer failures occur.

It must be appreciated that the speed of the print media relative to the printhead typically has variation to it, in the form of wow or flutter. The period between pulses from the tachometer therefore will have some variation. When operating a digital printer near the red line limit, failure to account for such speed variations can cause the instantaneous printer speed to exceed the redline limit even if the average printer speed is less than the redline limit. That is, the tachometer pulse period may be temporarily less than the PLM period even if the average period is greater than the PLM period.

In a digital printer, even a single tachometer or encoder pulse that trails the preceding tachometer or encoder pulse by less than the PLM period can produce an error. In the prior art, this problem was dealt with in one of the following ways: 1) discarding the encoder pulse, 2) generation of an error, 3) buffering lines of data at the printhead and printing on the next available cycle, or 4) maintaining a large difference between the average speed of the transport and the maximum printing speed of the web to allow head room for peak variations in the tach. However, each of these existing approaches has drawbacks.

It would be desirable, therefore, to allow all encoder pulses to be accounted for, particularly for cases of short bursts in the encoder pulse rate due to noise and short speed variations that exceed maximum printing speed.

SUMMARY OF THE INVENTION

This need is met by the circuit according to the present invention wherein incoming encoder pulses are processed to guarantee a minimum pulse width and maintain a higher average throughput for a print engine.

In accordance with one aspect of the present invention, a circuit for processing incoming encoder pulses for an imaging system, comprises an incoming signal from the controller, and means for processing the incoming signal by effectively creating an edge transition at the incoming frequency of the control signal. All the information from the controller is processed, and pulses are not lost or discarded.

Objects and advantages of the invention will be apparent from the following description, the accompanying drawing and the appended claims.

DETAILED DESCRIPTION OF THE PREFERRED EMBODIMENTS

Digital printers commonly employ encoders to monitor the motion of the recording media in relation to the printhead. Successive pixel locations in the direction of the relative motion of the printhead and the recording media are defined by pulses received from the encoder. The printer, therefore, prints appropriate pixels on the recording media in response to pulses received from such an encoder. U.S. Pat. No. 5,803,628 describes a hand shaking system that accumulates tach encoder pulses that initiate print cycle(s) and a printer that decrements the accumulated tach pulse(s) upon completion of a print cycle to accomplish maximum printer speed without print errors.

The present invention does not require a hand shaking system with the printer, although persons skilled in the art will realize that it could be used in that way to accommodate a wide variety of outputs such as print engines. With the present invention, the minimum period is able to be defined, based on whatever the present system limitation is, such as data system maximum throughput or stimulation cycle frequency. The present invention describes a filter system that filters and accumulates encoder pulses that initiate print cycle(s) based on a minimum period criteria to accomplish maximum printer speed without print errors. Extraneous pulses and edges are filtered out for improved imaging. The filter system of the present invention is programable to accommodate a wide variety of inputs (transports) and outputs (print engines).

Figure 1:
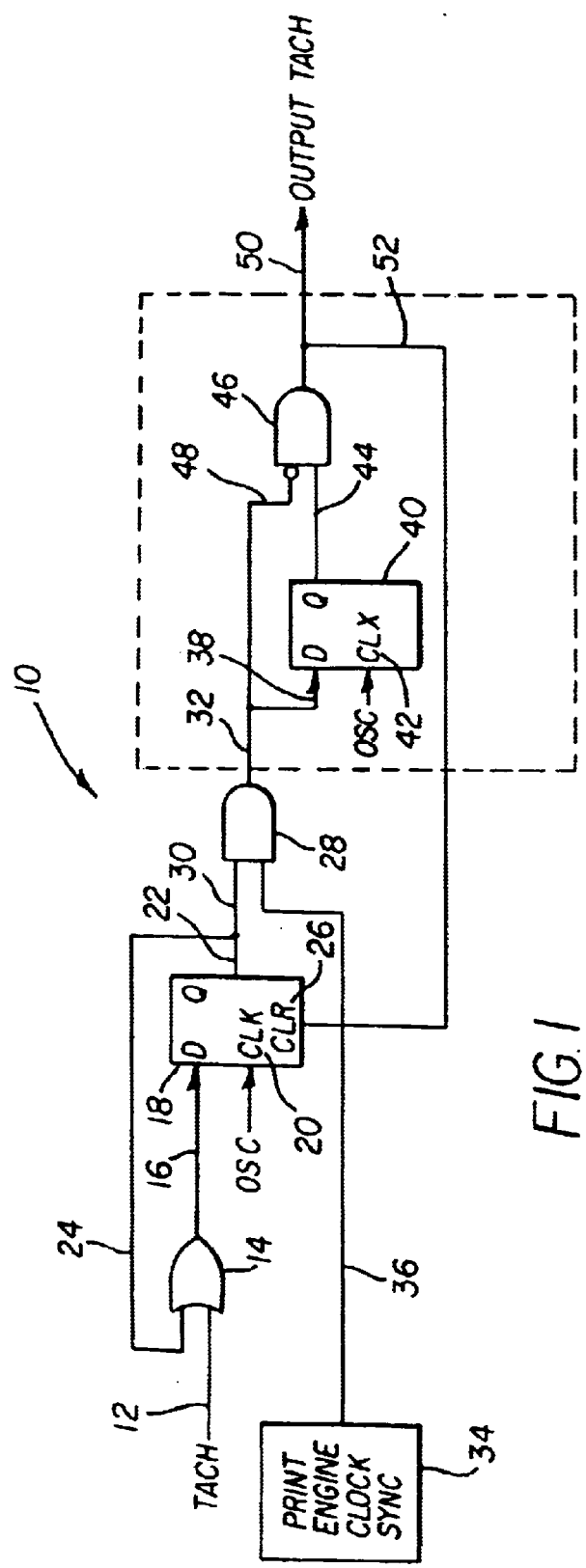
FIG. 1 is a prior art system for processing the encoder signal.

Referring to the drawings, FIG. 1 shows a prior art circuit diagram 10 for handling encoder pulses. The encoder output at 12 serves as an input for OR gate 14. A logic high pulse from the encoder causes the output of the OR gate to go high. When a logic high signal is received at D input 16 of flip-flop 18, the next pulse to the CLK input 20 produces a high output at 22. The CLK input is driven by a high frequency clock, typically 20 MHz. The maximum frequency of pulses from the encoder is typically 100 kHz. The high output from the flip-flop 18 is supplied to OR gate 14 along 24, keeping the output of the OR gate high even when the encoder input goes low. In this way, the output of the flip-flop will remain high until logic high is received at CLR input 26.

The output of the flip-flop 18 is also supplied to one input of an AND gate 28, via input 30. The output 32 of AND gate 28 will remain low until high input is also received from the maximum print rate clock (MPR) 34 along input 36. The pulse rate from clock 34 corresponds to the maximum print speed of the print engine. With the output 30 of the flip-flop 18 high, the AND gate 28 will output a high when the next logic high pulse is received from the MPR clock 34. The output from the AND gate 28 remains high until the end of the logic high MPR clock pulse.

The output 32 of AND gate 28 is supplied to D input 38 of another D-TYPE flip-flop 40. With a logic high signal at its D input, at the next pulse to the CLK input 42 from the high frequency clock, the flip-flop 40 produces a high output 44. When the output from AND gate 28 goes low, at the end of the logic high MPR clock pulse, the output of flip-flop 40 remains high until the next logic high pulse is input into the CLK 20 from the high frequency clock.

The output of flip-flop 40 is supplied as one input to AND gate 46, while the second input to AND gate 46 is the inverted signal 48 from AND gate 28. The output of AND gate 46 is normally low. However, when the output of the AND gate 28 goes low, the inverted AND gate signal 48 goes high. At this same time, the flip-flop 40 output 44 remains high until the next high frequency clock pulse is received. Therefore, until the next high frequency clock pulse is received to drop the flip-flop 40 output, both inputs of AND gate 46 are high, producing a high signal at its output 50. The second AND gate 46 therefore outputs one pulse having a width about equal to the pulse width of the high frequency clock every time the first AND gate 28 produces a pulse. The output 52 of the second AND gate 46 is supplied to the CLR input 26 of the first flip-flop 18. A high pulse from the AND gate 46 resets the output of the first flip-flop 18 to the low output state, independent of its D and CLK input values.

This prior art circuit 10 serves to output one pulse synchronized to the clock signal following an encoder pulse. The combination of the flip-flop and the OR gate serves as a latch to the encoder logic high pulse so that the timing of the encoder pulses to the MPR clock pulses is not critical. One pulse will be output for each MPR clock pulse as long as at least one encoder pulse has been received since the previous clock pulse.

As long as the encoder pulse rate is slower than the printer clock rate, one pulse is output from the circuit 10 for each received encoder pulse. However, if the encoder pulse rate exceeds the clock rate, more encoder pulses will be received by the circuit than it can output. For example, consider the case where one encoder pulse has been received to set the flip-flop into the high output state. If a second encoder pulse is received before a clock pulse is received, the output of the flip-flop is not affected by the second encode pulse. Therefore, when the next clock signal is received, only one pulse will be created at the output, not two as were received from the encoder. This prior art circuit 10 therefore limits the processed encoder signal so that the pulse rate cannot exceed that of the MPR clock.

While circuit 10 effectively prevents printing errors produced by trying to print faster than the print engine can accept data, it does allow encoder pulses to be lost. One effect of this is a stretching of the printed image, doubling the spacing between adjacent pixels. This can lead to greatly distorted images. When the print rate is slightly below the maximum print rate, the encoder produces pulses corresponding to the desired spacing of the pixels, all of which are used. If, however, the print speed is slightly above the maximum print rate, two encoder pulses might input into circuit 10 before one pulse can be can be output. As the circuit will only output one pulse in this case, adjacent pixels will be spaced two pixels spacings apart rather than one.

Figure 2:
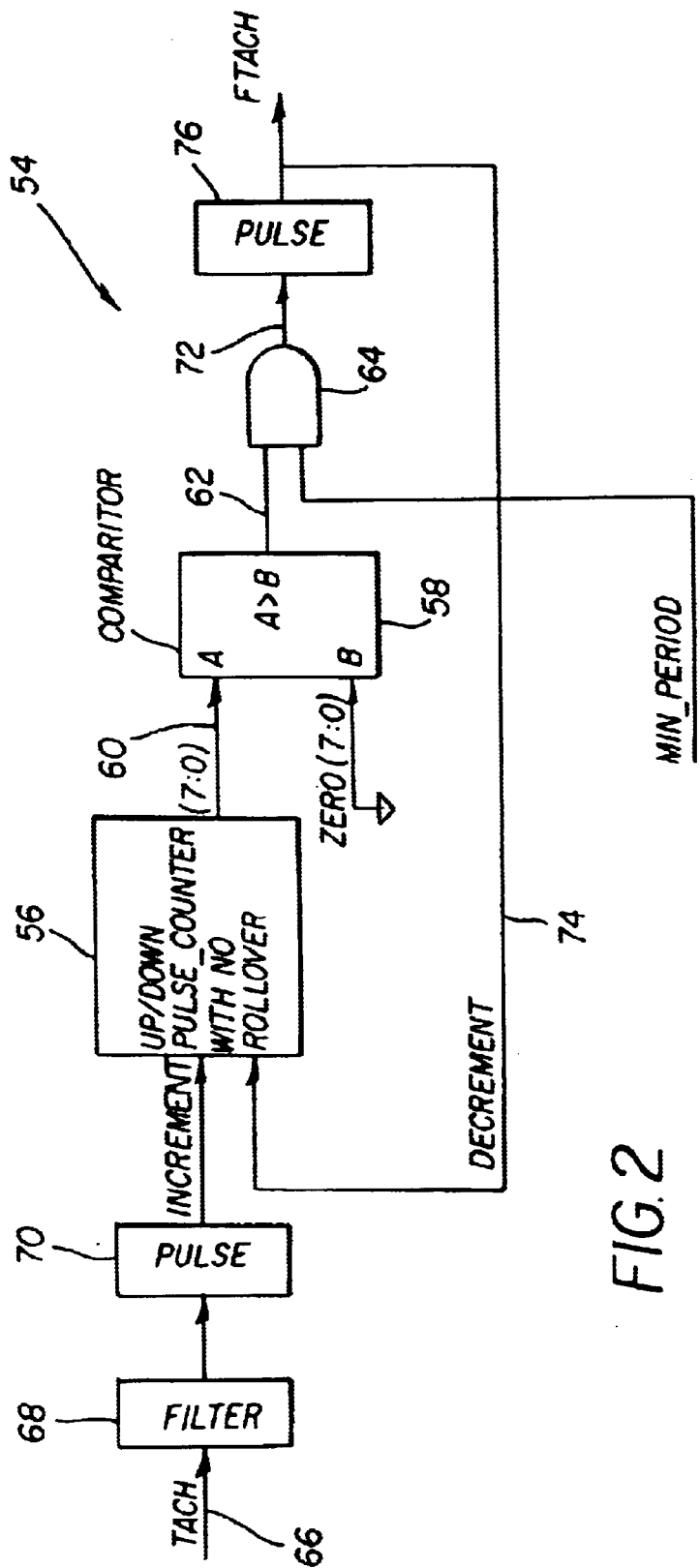
FIG. 2 illustrates one embodiment of the present invention wherein the encoder pulse rate is allowed to exceed the maximum speed clock rate for short intervals without rejecting any of the encoder pulses.

FIG. 2 shows one embodiment of the present invention which allows the encoder pulse rate to exceed the maximum speed clock rate for short intervals without rejecting any of the encoder pulses. In circuit 54, the flip-flop 18 of FIG. 1 has been replaced with an Up/Down Counter With No Rollover (UDC) 56 and a comparator 58. The unit 56 is an 8 bit counter, having separate count up and count down inputs. Initially, it can be assumed that the count level of the UDC 56 is at zero. The comparator 58, looking at the 8 bit output 60 of the UDC 56, will have a low output 62, as the UDC output 60 is not higher than zero. A low comparator output 62 keeps the output of the AND gate 64 low, independent of the maximum speed clock input. Once an incremented encoder pulse 66, filtered at filter 68 and pulsed at 70, is received by the UDC 56, the 8 bit output 60 would show a count of 1. The comparator output 62 would then go high. With this input to the AND gate 64 held high, the output 72 of the AND gate 64 will go high when the next clock pulse is received. At the falling edge of the clock pulse, the AND gate output 72 goes low. The output of the AND gate 64 is connected to the count down input of the UDC 56. The falling edge of the AND gate output, decremented along line 74 after pulsing at 76, causes the UDC 56 to count down one, returning the count level to zero. The rising edge of the output of the AND gate 64 is converted to a pulse by the pulse circuit 76 and then connected to the count down input of the UDC. The UDC 56 then counts down one, returning the count level to zero. As long as the encoder pulse rate is lower than the clock rate, the UDC output will vary between 0 and 1. Under these circumstances, the circuit 54 will act equivalent to the prior art circuit 10 of FIG. 1.

If, however, the encoder pulse rate should temporarily exceed the clock rate, the UDC 56 serves as a buffer for the encoder pulses. By way of example, consider the case where the UDC output 60 is one when a encoder pulse is received before a clock pulse is received. A clock pulse had not yet been received to cause the output of the AND gate to decrement the UDC back to zero. The UDC will then increment up one to two. When the circuit 54 receives the next clock pulse, an output pulse is then produced and the UDC is decremented by one. As the output is still at one, the comparator output remains high. The AND gate can then produce an output pulse when the next clock pulse is received, even if an additional encoder pulse is not received. In this way, the circuit 54 is able to output the same number of pulses as were received from the encoder. With an 8 bit UDC, circuit 54 can buffer up to 255 encoder pulses without losing any pulses.

Figure 3:
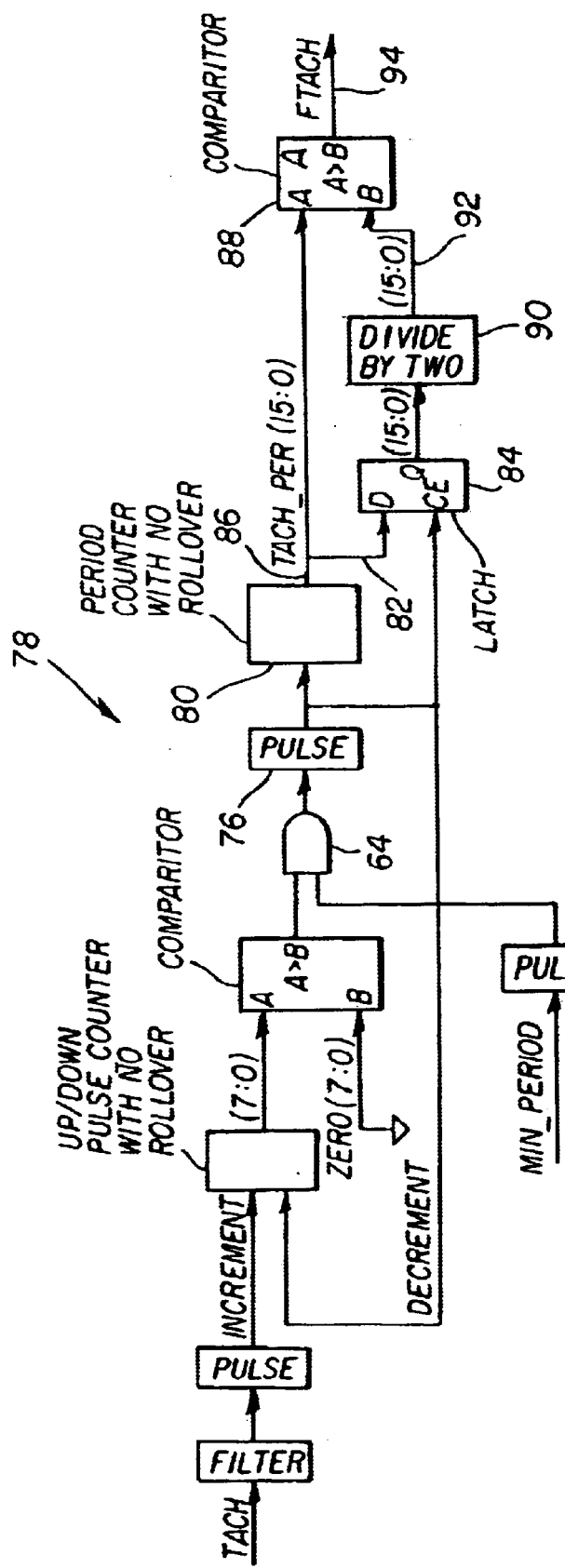
FIG. 3 is a circuit diagram that overcomes the asymmetric output signal that can occur with the circuit embodied in FIG. 2.

The circuit 54 of FIG. 2 can have an output signal that is quite asymmetric. That is, the high pulses can be much narrower than the low intervals between pulses. For some circuit applications, such a consequence may be undesirable. Therefore, circuit 78 shown in FIG. 3 is proposed as an alternative embodiment of the present invention. The front portion of circuit 78 is identical to circuit 54 of FIG. 2. In FIG. 3, however, the pulse from 76 is also supplied to a period counter 80 and to a latch enable input 82 of the latch circuit 84. The pulse to the period counter resets it so that it begins a measurement of the time since the pulse. The 16 bit period counter output 86 is supplied continuously to both a comparator 88 and to the data inputs of the latch 84. The pulse that resets the period counter also enables the latch to retain the counter output which was started at the previous pulse from the pulse circuit. This latched period counter output corresponds to the period between the last two pulses. This latched 16 bit period counter output is then divided by two at 90, and supplied to the comparator 88 along line 92. Immediately after a pulse is received to reset the period counter, the output time measurement values will be less than the divide by two value at 90. The output 94 of the comparator 88 will therefore be low. Once the time since the last pulse exceeds the value at 90, half the previous period, the comparitor output 94 will go high. It will remain high until the next pulse is received by the period counter to reset it. In this way, the output of circuit 78 in FIG. 3. will be close to a symmetric square wave.

Figure 4:
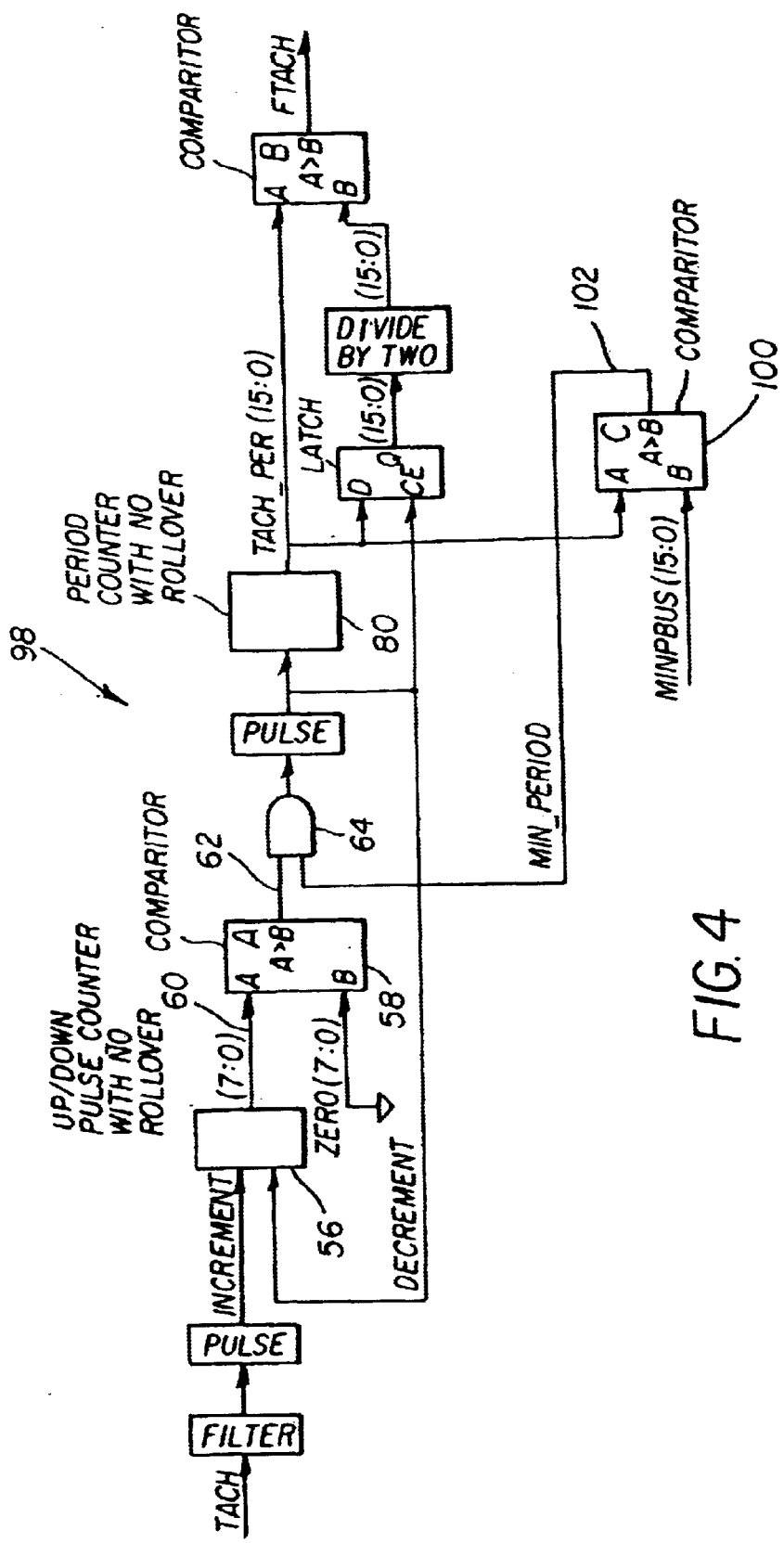
FIG. 4 is a circuit diagram illustration of another embodiment of the present invention.

FIG. 4 illustrates another embodiment of the present invention. Circuit 98 of FIG. 4 is particularly useful when the minimum period circuit is part of a data system than can be used with various print engines that may have different maximum print rates. Rather than require the print engines to supply a maximum print rate clock back to the data system, circuit 98 only requires the numerical value of the minimum print rate period. When the time measured by the period counter since it was last reset exceeds the minimum period value supplied to comparator 100, comparator 100 produces a high output 102. This output will remain high until the period counter 80 is reset. An output from comparator 100 therefore indicates that the minimum period requirement has been meet. The comparator 100 output 102 is supplied to the AND gate 64 in the same way that the MPR clock had been in the previous embodiments.

The embodiment illustrated in FIG. 4 is easily programable and can be tailored to a wide variety of conditions such as different print heads, resolutions, and print sequences. The circuit 98 normally outputs encoder pulses transparently and in real time when the pulse rate does not force the minimum period requirement to hold off the output pulse. For pulse periods less than the maximum period count, the circuit also restores the encoder pulse to a square wave by creating an edge transition at half the incoming frequency. Short pulses are eliminated even for pulse periods less than the maximum period count, with the pulse width defined as the maximum period count. In the prior art, either a higher resolution encoder or the output of short pulses is required, with the corresponding disadvantages of higher cost encoders, noisier encoders, more difficult debugging, and possible system errors with short pulses that are inverted through the data station or print engine.

The invention has been described in detail with particular reference to certain preferred embodiments thereof, but it will be understood that modifications and variations can be effected within the spirit and scope of the invention.

What is claimed is:

1. A system for processing incoming encoder pulses for an imaging system that prints on a recording media in response to pulses from an encoder, the system comprising:

means for receiving pulses from an encoder;

output pulse generation means for generating output pulses that can by employed by the imaging system to define pixel locations;

means determining a difference between the number of pulses received from the encoder and the number of output pulses;

means for determining whether this difference is positive;

means to define a minimum period between output pulses;

means to prompt the output pulse generation means to produce a pulse when the difference is positive and the time since the last output pulse exceeds the minimum period.

2. A system as claimed in claim 1 further comprising means for defining the minimum period based on any available system limitation.

3. A system as claimed in claim 1 wherein the means for determining a difference between the number of pulses received from the encoder and the number of output pulses comprises an up/down counter having separate inputs to increment and decrement count.

4. A system as claimed in claim 1 wherein the means to define a minimum period between output pulses comprises means to input clock signals from a minimum period clock.

5. A system as claimed in claim 1 wherein the means to define a minimum period between output pulses comprises:

means to input a value corresponding to the minimum period;

means to measure time elapsed since a previous output pulse;

means for comparing the measured time with the input value corresponding to the minimum period; and means for indicating that the minimum period requirement is met.

6. A system as claimed in claim 1 wherein the output pulse generation means comprises:

means for measuring time elapsed since a previous output pulse to generate a period between preceding output pulses;

means for storing a measured value of the period between preceding output pulses;

means for dividing the measured value of the period by an integer to generate a divided down value of the period;

means for comparing the measured time elapsed since the previous output pulse to the divided down value of the period, whereby when the measured time elapsed since a previous pulse is greater than the divided down value of the period, an output level is adjusted; and means for producing a prompt for an output pulse and returning the output level to its initial condition when said prompt is received.

7. A system as claimed in claim 6 wherein the means for dividing the measured value of the period by an integer comprises means for dividing the measured value of the period in half.

8. A method for processing incoming encoder pulses for an imaging system that prints on a recording media in response to pulses from an encoder, the method comprising the steps of:

receiving pulses from an encoder;

using output pulse generation to generate output pulses that can by employed by the imaging system to define pixel locations;

determining a difference between the number of pulses received from the encoder and the number of output pulses;

determining whether this difference is positive;

defining a minimum period between output pulses;

prompting the output pulse generation to produce a pulse when the difference is positive and the time since the last output pulse exceeds the minimum period.

9. A method as claimed in claim 8 further comprising the step of defining the minimum period based on any available system limitation.

10. A method as claimed in claim 8 wherein the step of determining a difference between the number of pulses received from the encoder and the number of output pulses comprises the step of providing an up/down counter having separate inputs to increment and decrement count.

11. A method as claimed in claim 8 wherein the step of defining a minimum period between output pulses comprises the step of inputting clock signals from a minimum period clock.

12. A method as claimed in claim 8 wherein the step of defining a minimum period between output pulses comprises the steps of:

inputting a value corresponding to the minimum period;

measuring time elapsed since a previous output pulse;

comparing the measured time with the input value corresponding to the minimum period; and indicating that the minimum period requirement is met.

13. A method as claimed in claim 8 wherein the step of generating output pulses comprises the steps of:

measuring time elapsed since a previous output pulse to generate a period between preceding output pulses;

storing a measured value of the period between preceding output pulses;

dividing the measured value of the period by an integer to generate a divided down value of the period;

comparing the measured time elapsed since the previous output pulse to the divided down value of the period, whereby when the measured time elapsed since a previous pulse is greater than the divided down value of the period, an output level is adjusted; and producing a prompt for an output pulse and returning the output level to its initial condition when said prompt is received.

14. A method as claimed in claim 13 wherein the step of dividing the measured value of the period by an integer comprises the step of dividing the measured value of the period in half.

* * * * *